United States Patent [19]
Alban

[11] 4,070,910
[45] Jan. 31, 1978

[54] FLUID FLOW MEASURING APPARATUS

[76] Inventor: William R. Alban, 6740 Africa, Galena, Ohio 43021

[21] Appl. No.: 716,373

[22] Filed: Aug. 23, 1976

Related U.S. Application Data

[63] Continuation-in-part of Ser. No. 625,946, Oct. 28, 1975, Pat. No. 4,007,634.

[51] Int. Cl.² .............................................. G01F 3/14
[52] U.S. Cl. ...................................... 73/239; 137/852
[58] Field of Search ...................... 73/239, 272 R, 113; 251/331, 852, 860

[56] References Cited
U.S. PATENT DOCUMENTS 2,564,697  8/1951  Kelley ................................. 73/425.6
3,344,667  10/1967  Maltby ............................... 73/113 X Primary Examiner—Jerry W. Myracle

[57] ABSTRACT

A fluid flow measuring apparatus characterized by a low friction piston and seal construction which is operable at low differential pressures. The piston and seal construction is further characterized by a bi-directional pressure relief feature that eliminates the possibility of flow blockage in the fluid system in which the apparatus is operating.

14 Claims, 6 Drawing Figures

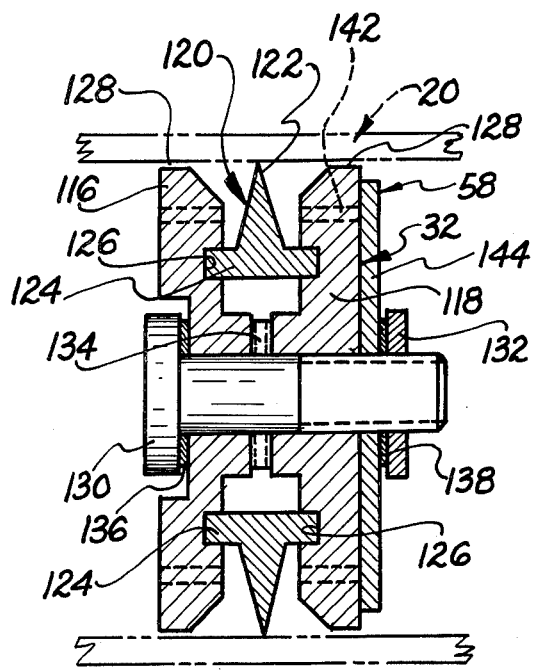
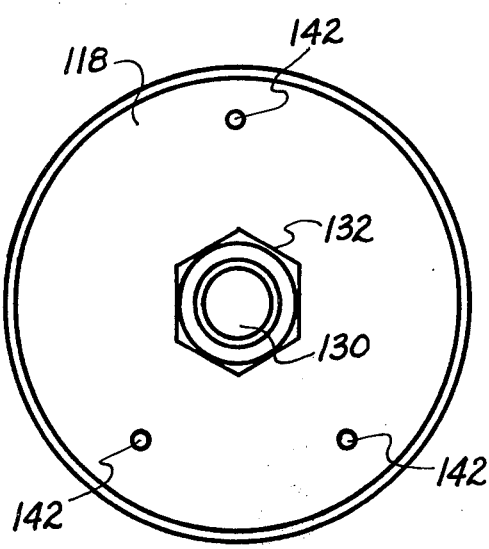
FIG. 1.
FIG. 2.
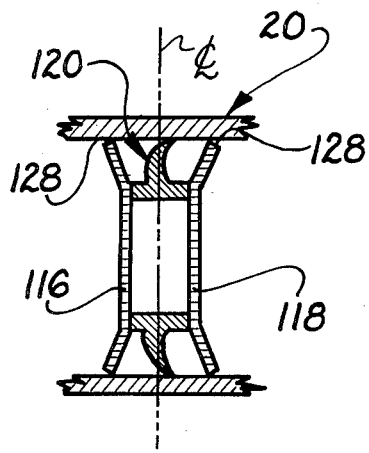
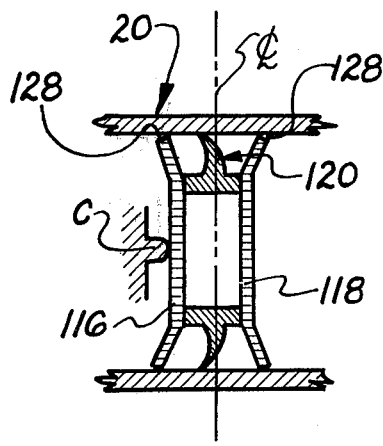
FIG. 3.
FIG. 4.

FLUID FLOW MEASURING APPARATUS

REFERENCE TO CO-PENDING APPLICATION

This application is a continuation-in-part of my co-pending application Ser. No. 625,946, filed Oct. 28, 1975, now U.S. Pat. No. 4,007,634.

BACKGROUND OF THE INVENTION

In the measuring of flows in fluid systems there has been a problem in the art in that existing apparatus cannot operate with high sensitivity at low pressure differentials where minute pressure losses can alter the system being monitored. As a solution to this problem, the present invention provides a positive displacement flow measuring apparatus that includes a metering cylinder provided with a novel position revealing piston and seal arrangement adapted to precisely establish piston position with respect to flow volume through the system being monitored.

SUMMARY OF THE INVENTION

In general, the fluid flow monitoring apparatus of the present invention comprises a positive displacement fuel metering cylinder which includes a novel position revealing piston and flexible seal assembly adapted to precisely establish piston position with respect to flow volume, said piston and seal assembly being of high sensitivity and low friction so as to provide extremely precise flow measurements at low pressure differentials.

As another aspect of the present invention, the flow measuring apparatus includes a positive displacement fluid metering cylinder which includes a novel position revealing piston and flexible seal assembly which is adapted to yield over center in both of its directions of travel, responsive to fuel pressure, from a first sealing configuration to a second pressure relief configuration thereby providing a fail-safe feature for the system.

As another aspect of the present invention the flow measuring apparatus, in some of its embodiments, is provided with novel lubricating means for the flexible seal and hence is particularly adaptable for the flow monitoring of gaseous fluids.

As another aspect of the present invention, the above mentioned flexible seal is of a unique configuration that produces a flip-flop action during operation of the seal, with a resulting stress reversal and stress regenerative action in the wiper wedge area of the seal.

As another aspect of the present invention, the above mentioned position revealing piston includes adjusting means for varying the residual stresses within the flexible seal. Hence, such adjusting means can be used to establish proper wall contacting force between the periphery of the seal and the cylinder so as to achieve low friction sealing and proper flip-flop action during operation of the flexible seal.

As another aspect of the present invention the above mentioned flexible seal is highly resilient at the zone of the sealing contact and hence adapted to transcend any foreign particles present in the fluid, which particles would jam a rigid type seal.

As still another aspect of the present invention, the above mentioned adjusting means for the flexible seal provides means for readily compensating for wear at the sealing edge.

It is a primary object of the present invention to provide a fluid flow measuring apparatus which includes a novel flow volume metering cylinder that operates with high sensitivity and precision thereby producing highly precise flow measurements at low pressure differentials.

It is another object of the present invention to provide an apparatus of the type described that includes a positive displacement metering cylinder provided with a fail-safe relief value feature.

It is another object of the present invention to provide a flow volume metering apparatus that includes a unique piston construction that includes an elastic seal, and adjustable piston ends, the latter providing means for making adjustments of residual stresses within the elastic seal.

It is another object of the present invention to provide a flow measuring apparatus that includes novel seal lubricating means that adapts the apparatus for monitoring the flow of gaseous fluids.

It is another object of the present invention to provide a flow measuring apparatus that includes novel seal lubricating means of a unique construction that produces a flip-flop action during operation of the seal, with a resulting stress reversal and stress regenerative action in the wiper wedge area of the seal.

It is another object of the present invention to provide a novel piston and flexible seal construction for a flow measuring apparatus which includes adjusting means for varying the residual stresses within the elastic body of the flexible seal. Hence the proper low friction sealing force can be readily established.

It is another object of the present invention to provide a novel piston and flexible seal construction for a flow measuring apparatus which construction includes adjusting means for compensating for wear at the wiping edge of the seal.

Further objects and advantages of the present invention will be apparent from the following description, reference being had to the accompanying drawings wherein preferred forms of embodiments of the invention are clearly shown.

BRIEF DESCRIPTION OF THE DRAWINGS

FIG. 1 is a side sectional view of a position revealing piston and seal apparatus comprising a portion of the flow measuring apparatus of the present invention;

FIG. 2 is an end elevational view corresponding to FIG. 1;

FIG. 3 and FIG. 4 are diagrammatic views showing the piston and seal apparatus of FIGS. 1 and 2 in various operational configurations thereof;

DESCRIPTION OF THE PREFERRED EMBODIMENT

Figure 5:
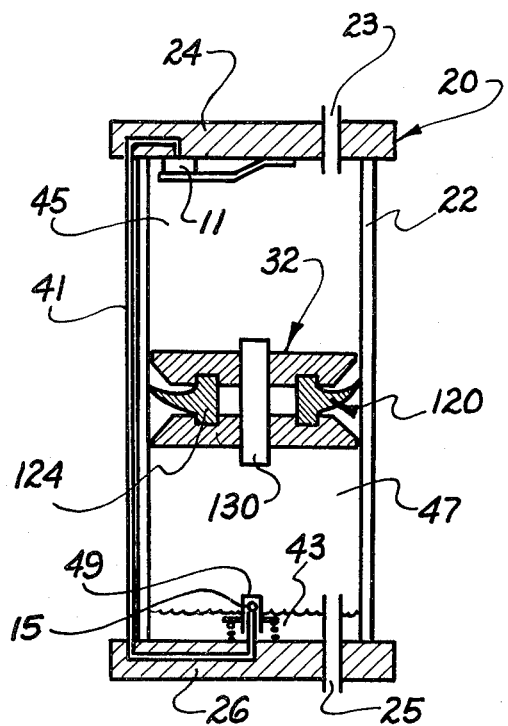
FIG. 5 is a side sectional view of a flow measuring apparatus constructed in accordance with the present invention.

Referring in detail to the drawings, a fluid flow measuring apparatus constructed in accordance with the present invention is indicated generally at 20 in FIG. 5 and includes a cylinder 22 and end bulkheads 24 and 26. The cylinder further includes inlet-outlet ports 23 and 25.

With continued reference to FIG. 5, a position revealing piston and seal assembly is indicated generally at 32 and mounted for reciprocating movement in cylinder 22.

It should be mentioned that the flow metering apparatus of the present invention is particularly adaptable to measure the flow of liquids, such as the flow of fuel in a digital fuel flow rate monitoring apparatus, as is shown and described in detail in my previously mentioned co-pending application Ser. No. 625,946 filed Oct. 28, 1975, now U.S. Pat. No. 4,007,634 of which this application is a continuation-in-part.

Figure 6:
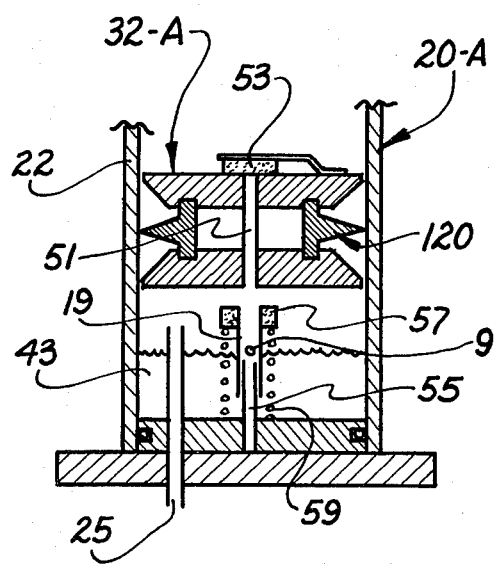
FIG. 6 is a side sectional view of a modified flow measuring apparatus constructed in accordance with the present invention.

The flow measuring apparatus of the present invention, in certain of its embodiments, is also adaptable for monitoring the flow of gaseous fluids and two of such embodiments are illustrated in FIGS. 5 and 6 and will be described in detail later herein.

Reference is next made to FIGS. 1 through 4 which illustrate the previously mentioned piston and seal assembly 32. Such assembly includes piston ends 116 and 118 which serve as a mount for an annular sealing element indicated generally at 120 which includes a wiping edge 122 and base flanges 124 disposed in inwardly facing grooves 126 of the piston ends. It will be noted from FIG. 1 that the piston ends 116 and 118 include by-pass relief passages 142 and the periphery thereof form annular stabilizing shoulders 128.

The two piston ends are joined together by a bolt 130 and a self-locking nut 132 with such bolt nut being formed of non-metallic material. A plurality of thin washers 134 are used as spacers for adjusting the distance between the cylinder ends and fluid seal washer 136 and 138 are provided under the head of the bolt and the nut. Also, a thrust washer 144 is provided under lock nut 132.

Reference is next made to FIGS. 3 and 4. In FIG. 3, the piston is shown traveling to the left with the seal 120 having its wiper edge slightly trailing the center line of the piston. When the piston arrives at the end of the stroke, as seen in FIG. 4, and engages piston reversing sensor C, and in the event that such sensor has jammed or there is an electrical failure such that no reversing signal is delivered, then in that event the very small pressure required to move the piston begins to build up on the right side of the piston causing flexible seal 120 to move over center to the configuration seen in FIG. 4. The pressure will then drop to a steady value as fluid is driven past the sealing edge of the piston. It will be understood that the magnitude of pressure required for seal by-pass can be controlled by pre-load seal forces and flexible characteristics of the material. Hence, it will be seen that the flexible seal functions as a fail-safe pressure relief valve.

It should be mentioned that piston reversing sensor C, FIG. 4, is one of two sensors used in a control circuit for a fuel flow rate monitor, not illustrated, with such control circuit being described in detail in my previously mentioned co-pending application Ser. No. 625,946.

In the preferred seal configuration, the seal is molded to approximately the shape shown in FIG. 1 with an outside diameter of 1.500 inches when used with an inside cylinder diameter of 1.500 inches, an inside diameter of 0.75 inches. The seal wedge is 30° with the base width of 0.375 at the anchor rings.

The diameter of the cylinder ends, which are formed of plastic material, is preferably 1.48 inches so as to provide proper stabilization of the end seal assembly. It should be mentioned that the by-pass relief holes 142 are an optional feature and may be desirable depending on the flow volume requirements.

It has been determined that with a piston seal configuration and size mentioned above a very low motive force is required to move the piston with resulting high efficiency. It has been determined that the pressure differential across piston 32 is from 0.2 to 0.4 psi with the piston in motion and a 0.6 psi maximum pressure for over center movement to induce intial motion.

With an operational differential pressure range of 1.5 psi or less, the leakage by the piston is extremely low in the area of 0.000006 gallons per hour.

It has been further determined that the seal is responsive to fluid flow in the 0.2 to 20 gallons per hour range.

Referring again to the seal 120, it is formed of rubber type material and must include a narrow peripheral sealing edge which edge is held against the cylinder wall by piston ends 116 and 118. The piston ends give fixity to the seal structure, form an end diaphram, and, as a pair, give axial stability to the piston assembly. The stabilizing edges 128 of the piston ends have clearance and smoothness to invite minimum drag when contacting the cylinder wall in performing as a stabilizer. The seal surface configuration is shown feather thin and thus represents the application of a very narrow and light seal surface, yet effective. The seal and the cylinder surface must be very smooth and void of scratches or nicks.

The feather thin sealing edge shown is effective. However, a radius on the sealing edge will also work with a variation in operating characteristics.

The rubber type material must have flexure and retain residual forces within the material for an extended period of time. The magnitude of the residual forces are controlled by the geometrics of the seal and piston ends which provide end fixity and can also induce residual forces. The residual forces required for effective function is a wide band permitting some erosion of internal stress, seal wear, and some transient variations.

The piston is unrestricted in axial motion except for end sensors and friction at the seal surface, with the piston being driven by the differential pressure across it. If the differential pressure needed to overcome friction at the seal is less than the differential pressure required for leakage, the piston will move without fluid leakage past the seal.

Mechanical fluid leakage is fluid flow and must be powered by a differential pressure. Thus, low friction leads to a low differential pressure and a very low potential for seal leakage.

It should further be pointed out that the seal force and friction decrease when the piston is moving and when the piston encounters the small force of the end sensors, the seal, if it moves at all, will move to a position of greater seal force again discouraging leakage.

Reference is next made to FIGS. 5 and 6 which illustrate modifications of the fluid flow measuring apparatus which modifications are adapted for metering gaseous fluids.

In general, the modifications of FIGS. 5 and 6 include apparatus for improving the operation of the low friction piston seal by lubricating same with a liquid lubricant.

When operating as a gas meter an unlubricated seal is forced to operate with a dry frictional engagement with the cylinder wall. Such frictional engagement can be much reduced by using an appropriate liquid lubricant that is maintained at the sealing location by a pump or plunger mechanism activated by movement of the piston so as to replenish the liquid lubricant as needed.

As additional advantages the lubricant will contribute to the sealing effect by forming a film on the cylinder wall as well as on the surface of the seal.

As a further advantage the liquid lubricant will reduce seal wear and on the up stroke will give a visual check as to whether gas bubbles are leaking past the seal.

It should be mentioned that in the embodiments of FIGS. 5 and 6 a metering cylinder 22 is oriented with the longitudinal axis in a vertical position with the sump 43 containing a suitable liquid lubricant being preferably provided by the bottom of chamber 47 of the cylinder. With continued reference to FIG. 5, a passage means 41 connects the sump 43 with the upper chamber 45 of the metering cylinder with a pump means or plunger 49 being provided at the inlet of passage means 41. A check valve 11 is positioned at the end of passage 41 leading to chamber 45.

It will now be understood that on the down stroke of the position revealing piston 32 the end of the cylinder bolt 130 will engage plunger 49 and pump a minute amount of lubricant through passage means 41 into chamber 45 where the lubricant can gravitate down to the wiping edge of resilient seal 120. An inlet port 15 permits fluid charge to enter a chamber within plunger 49 and a spring 13 is provided to reposition the plunger. It will be understood that as the piston 32 reciprocates back and forth it will intermittently engage plunger 49 and pump minute quantities of lubricant to the seal as required.

Referring next to FIG. 6, this embodiment is similar to the one of FIG. 5 previously described in that minute quantities of lubricant are intermittently delivered from a sump 43 to the upper chamber of the metering cylinder and hence to the wiping edge of resilient seal 120. Here the lubricant is delivered through the center of position revealing piston 32-A via a central passage 51. On the down stroke the bottom of the piston will engage a pump means or plunger 57 with an outer tube 19 of the plunger sliding in telescoping relationship with an inner tube 55 forcing it downwardly against the action of a compression spring 59. This action will cause lubricant to be delivered upwardly through the piston passage 51 with the light action check valve 53 opening on the down stroke of piston 32-A. Fluid passing through the check valve 53 will flow outwardly onto the wiping edge of resilient seal 120 as required. An inlet port 9 is provided in the side wall of tube 19 to permit fluid to enter the chamber therein.

While the forms of embodiments of the present invention as herein disclosed constitute preferred forms, it is to be understood that other forms might be adopted.

What is claimed is:

1. A fluid flow monitoring apparatus including a fluid metering cylinder; piston means mounted for reciprocation in said cylinder; and a low friction peripheral seal on said piston that functions as a bi-directional pressure relief means and that is normally flexed on one side of center during piston travel in one direction and shiftable to a pressure relief position on the other side of center responsive to pressure of said fluid flow upon arresting of said piston travel, said seal being normally flexed on said other side of center during piston travel in the other direction and shiftable to a second pressure relief position upon arresting of the piston travel.

2. The fluid flow monitor apparatus of claim 1 wherein said fluid metering cylinder includes sensors mounted on the ends thereof for signaling reversal of the direction of travel of said piston.

3. A fluid flow monitoring apparatus including a fluid metering cylinder; piston means mounted for reciprocation in said cylinder; a low friction peripheral seal on said piston that functions as a bi-directional pressure relief means and that is normally flexed on one side of center during piston travel in one direction and shiftable to a pressure relief position on the other side of center responsive to pressure of said fluid flow upon arresting of said piston travel, said seal being normally flexed on said other side of center during piston travel in the other direction and shiftable to a second pressure relief position upon arresting of the piston travel; and annular slideable stabilizing shoulder means on said piston adjacent said flexible peripheral seal.

4. The fluid flow monitor apparatus of claim 3 wherein said fluid metering cylinder includes sensors mounted on the ends thereof for signaling reversal of the direction of travel of said piston.

5. A fluid flow monitoring apparatus including a fluid metering cylinder; piston means mounted for reciprocation in said cylinder and including right and left piston portions each of which includes a seal mounting shoulder means; a low friction flexible seal including a seal base portion mounted on said seal mounting shoulder means and a peripheral wiping edge; and adjusting means for varying the distance between said piston portions and the resulting force exerted by said seal mounting shoulders on said seal base portion.

6. The apparatus defined in claim 5 wherein said seal is normally flexed on one side of center during piston travel in one direction and shiftable to a pressure relief position on the other side of center responsive to pressure of said fluid flow upon arresting of said piston travel, said seal being normally flexed on said other side of center during piston travel in the other direction and shiftable to a second pressure relief position upon arresting of the piston travel.

7. The fluid flow monitor apparatus of claim 5 wherein said fluid metering cylinder includes sensors mounted on the ends thereof for signaling reversal of the direction of travel of said piston.

8. A fluid flow monitoring apparatus including a fluid metering cylinder; piston means mounted for reciprocation in said cylinder; a low friction peripheral seal on said piston that functions as a bi-directional pressure relief means and that is normally flexed on one side of center during piston travel in one direction and shiftable to a pressure relief position on the other side of center responsive to pressure of said fluid flow upon arresting of said piston travel, said seal being normally flexed on said other side of center during piston travel in the other direction and shiftable to a second pressure relief position upon arresting of the piston travel; means forming a sump containing a liquid lubricant; passage means for delivering lubricant from said sump to said seal; and pump means actuated by movement of said piston for propelling lubricant through said conduit means.

9. The fluid flow monitor apparatus of claim 8 wherein said fluid metering cylinder includes sensors mounted on the ends thereof for signaling reversal of the direction of travel of said piston.

10. A fluid flow monitoring apparatus including a fluid metering cylinder; piston means mounted for reciprocation in said cylinder; a low friction peripheral seal on said piston that functions as a bi-directional pressure relief means and that is normally flexed on one side of center during piston travel in one direction and shiftable to a pressure relief position on the other side of center responsive to pressure of said fluid flow upon arresting of said piston travel, said seal being normally flexed on said other side of center during piston travel in the other direction and shiftable to a second pressure relief position upon arresting of the piston travel; annular slideable stabilizing shoulder means on said piston adjacent said flexible peripheral seal; means forming a sump containing a liquid lubricant; passage means for delivering lubricant from said sump to said seal; and pump means actuated by movement of said piston for propelling lubricant through said conduit means.

11. The fluid flow monitor apparatus of claim 10 wherein said fluid metering cylinder includes sensors mounted on the ends thereof for signaling reversal of the direction of travel of said piston.

12. A fluid flow monitoring apparatus including a fluid metering cylinder; piston means mounted for reciprocation in said cylinder and including right and left piston portions each of which includes a seal mounting shoulder means; a low friction flexible seal including a seal base portion mounted on said seal mounting shoulder means and a peripheral wiping edge; adjusting means for varying the distance between said piston portions and the resulting force exerted by said seal mounting shoulders on said seal base portion; means forming a sump containing a liquid lubricant; passage means for delivering lubricant from said sump to said seal; and pump means actuated by movement of said piston for propelling lubricant through said conduit means.

13. The apparatus defined in claim 12 wherein said seal is normally flexed on one side of center during piston travel in one direction and shiftable to a pressure relief position on the other side of center responsive to pressure of said fluid flow upon arresting of said piston travel, said seal being normally flexed on said other side of center during piston travel in the other direction and shiftable to a second pressure relief position upon arresting of the piston travel.

14. The fluid flow monitor apparatus of claim 12 wherein said fluid metering cylinder includes sensors mounted on the ends thereof for signaling reversal of the direction of travel of said piston.

* * * * *